United States Patent [19]
Sato et al.

[11] Patent Number: 5,282,536
[45] Date of Patent: Feb. 1, 1994

[54] TAPE CASSETTE ACCOMMODATING CASE WITH PROTRUSIONS

[75] Inventors: Shinichi Sato; Takateru Satoh; Hiroki Suzuki, all of Saku, Japan

[73] Assignee: TDK Corporation, Tokyo, Japan

[21] Appl. No.: 992,007

[22] Filed: Dec. 17, 1992

[30] Foreign Application Priority Data

Dec. 19, 1991 [JP] Japan .................. 3-110846[U]

[51] Int. Cl.⁵ .................................. B65D 85/672
[52] U.S. Cl. .................... 206/387; 206/493; 242/68.3
[58] Field of Search ............... 206/387, 392, 396, 493; 242/68.3, 199

[56] References Cited

U.S. PATENT DOCUMENTS 4,230,225  10/1980  Okada et al. .................. 206/387

FOREIGN PATENT DOCUMENTS 56-29820  7/1981  Japan .
57-31399  7/1982  Japan .
2010222   6/1979  United Kingdom .
2105306   3/1983  United Kingdom .

Primary Examiner—Bryon P. Gehman
Attorney, Agent, or Firm—Oblon, Spivak, McClelland, Maier & Neustadt

[57] ABSTRACT

A tape cassette accommodating case comprising: a case main body forming an accommodating portion of a tape cassette; a lid provided at said case main body capable of opening and closing; and a pair of hub-rotation-preventive protrusions standingly provided at said lid; said pair of hub-rotation-preventive protrusions each being composed of at least three stopper pieces radially provided to be inserted into a hub hole B; a relationship between a radius $r_2$ of said hub hole B and a radius $r_1$ from the center of the hub hole B to a front end of a hub claw, and respective lengths of said stopper piece a, b and c, being $c<a \leq b$, $r_1 \leq a < r_2$, $r_1 < b \leq r_2$ and $c<r_1$; angles of $\theta_2$, $\theta_3$ and $\theta_1$ made by said pieces a and b, b and c, and c and a being not multiples of 60° C.; wherein $120° < \theta_2 < 180°$ and $\theta_1 + \theta_2 + \theta_3 = 360°$.

2 Claims, 6 Drawing Sheets

TAPE CASSETTE ACCOMMODATING CASE WITH PROTRUSIONS

BACKGROUND OF THE INVENTION

This invention relates to an accommodating case for accommodating and storing a tape cassette wound with a tape such as a magnetic tape without causing a shift in winding of the tape.

Conventionally, a tape cassette is handled wherein it is accommodated in an accommodating case in selling and storing it. As such a case, a case having a rectangular case main body for accommodating a magnetic tape cassette, provided with a lid at an engaging portion thereof capable of opening and closing, is employed. In the accommodating case, rotation-preventive pieces are protrudingly provided which are to be inserted into a winding shaft hole of a hub to prevent the shift in winding and the rotation of the hub by engaging the rotation-preventive pieces with hub claws.

Furthermore, since the rotation-preventive piece of a hub in the accommodating case, is in a planar form, in accommodating the tape cassette, the rotation of the hub is prevented by inserting the rotation-preventive piece between the hub claws. Therefore, the hub is often fixed in a state wherein it hangs and floats on the rotation-preventive piece. To avoid this, it is proposed to change the shape of a stopper piece (Japanese Examined Patent Publication 29820/1981 and Japanese Examined Patent Publication No. 31399/1982).

However, even when the rotation-preventive stopper piece is flexed in approximately a sideway chevron shape so that it does not touch the hub claw, the hub is shifted upwardly and does not dig into the hub claw, the rotation-preventive function thereof is not sufficient. When the rotation-preventive function thereof is sufficient, the upward shifting is conspicuous which deteriorates an appearance and grade thereof, and which is not satisfactory.

It is an object of the present invention to remove these conventional drawbacks and to provide a tape cassette accommodating case, wherein the opening and closing operation of the lid of the accommodating case is performed smoothly, the rotation-preventive function of the hub is promoted, the tape cassette can be accommodated and maintained safely in the accommodating case without causing the shift in winding of the tape, the handling of the tape cassette is simplified, the upward shifting is prevented, and which is excellent in the appearance and quality, the construction of which is simple and the cost of which is inexpensive.

According to an aspect of the present invention, there is provided a tape cassette accommodating case comprising:

a case main body forming an accommodating portion of a tape cassette;

a lid provided at said case main body capable of opening and closing; and a pair of hub-rotation-preventive protrusions standingly provided at said lid;

said pair of hub-rotation-preventive protrusions each being composed of at least three stopper pieces radially provided to be inserted into a hub hole B;

a relationship between a radius $r_2$ of said hub hole B and a radius $r_1$ from the center of the hub hole B to a front end of a hub claw, and respective lengths of said stopper piece a, b and c, being $c < a \leq b$, $r_1 \leq a < r_2$, $r_1 < b \leq r_2$ and $c < r_1$;

angles of $\theta_2$, $\theta_3$ and $\theta_1$ made by said pieces a and b, b and c, and c and a being not multiples of 60° C.;

wherein $120° < \theta_2 < 180°$ and $\theta_1 + \theta_2 + \theta_3 = 360°$.

When a magnetic tape cassette A is accommodated in the case main body 1 and the lid 3 is closed with a center of swiveling at an engaging portion 2, covering the magnetic tape cassette A, the pair of hub-rotation-preventive protrusions 9 are inserted into the hub holes B of the tape cassette A, thereby regulating and maintaining the position thereof.

In this case, even when the tape cassette shifts on the left hand side or on the right hand side in the case thereby moving the hub, one of the three stopper pieces of the hub-rotation-preventing protrusions 9 prevents the movement without digging into the hub claw. Moreover, at least one stopper piece is always put between the hub claws, thereby firmly preventing the rotation of the hub and smoothly performing the opening and closing operation of the lid.

BRIEF DESCRIPTION OF THE DRAWINGS

In the drawings:

FIGS. 6A and 6B are longitudinal sectional diagrams of the embodiment of the FIG. 5 wherein FIG. 6A is a longitudinal sectional diagram taken along a line II—II of FIG. 5 and FIG. 6B, a longitudinal diagram taken along a line III—III of FIG. 5.

DETAILED DESCRIPTION OF THE PREFERRED EMBODIMENTS

Figure 1:
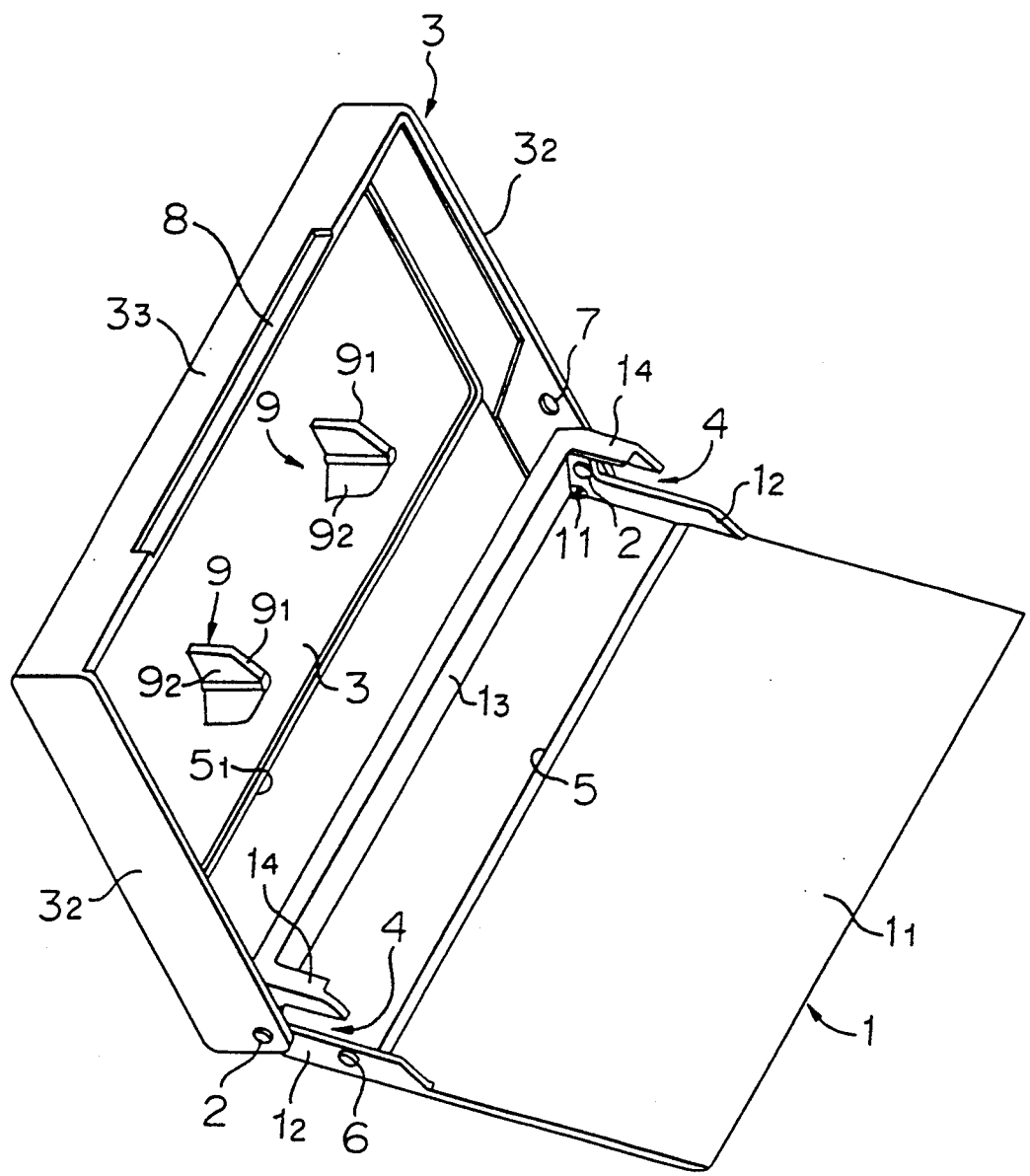
FIG. 1 is a perspective view of an embodiment of the invention showing the opened state of a lid.
Figure 2:
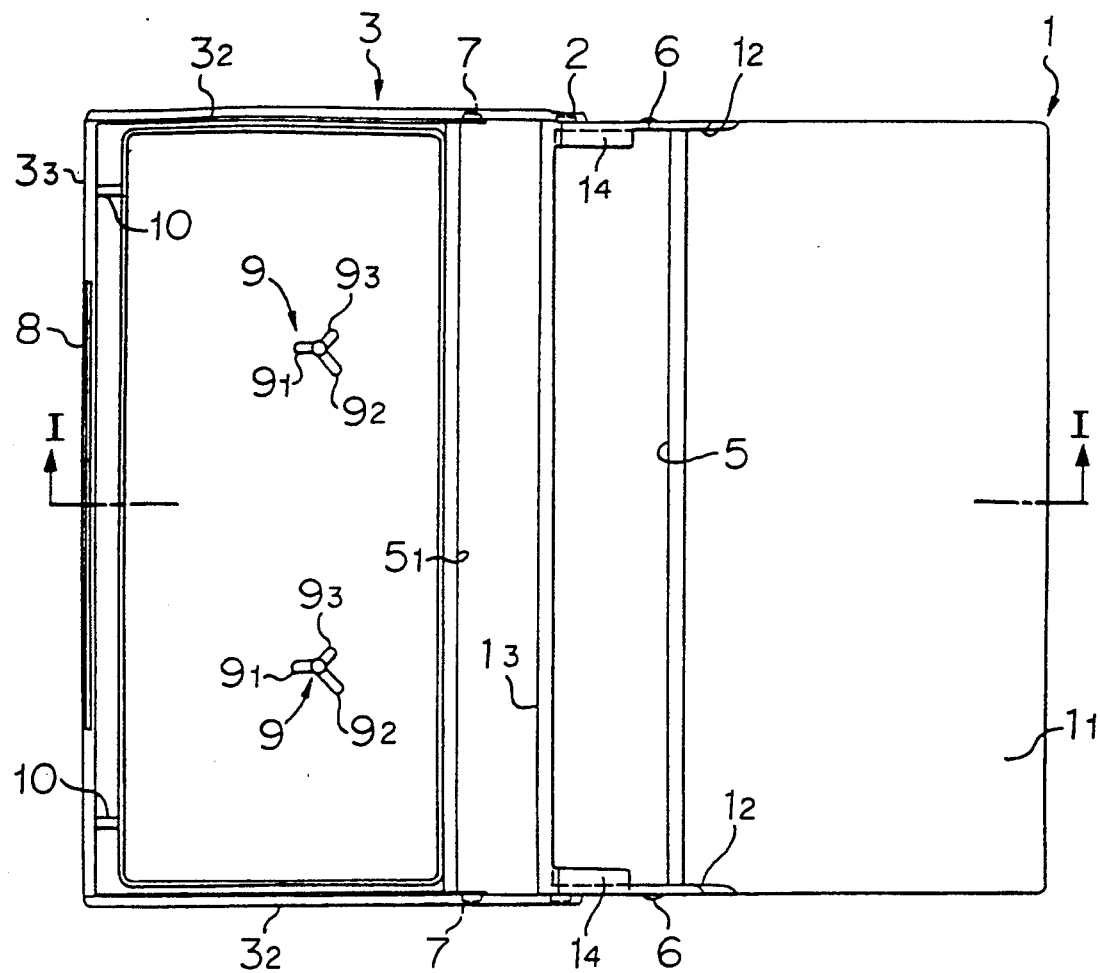
FIG. 2 is a plane view showing the opened state of the lid of the embodiment.
Figure 3:
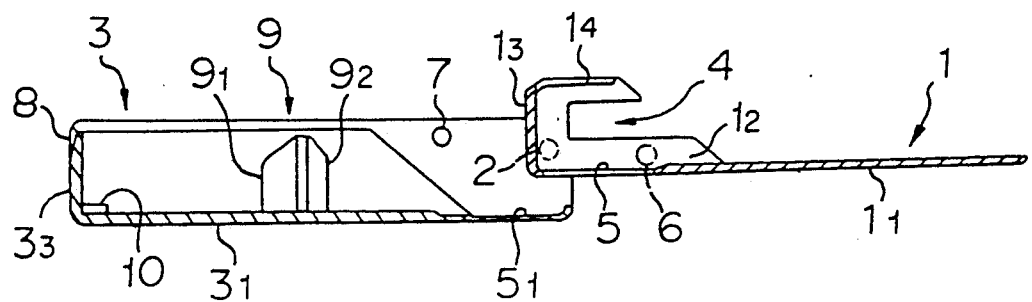
FIG. 3 is a longitudinal sectional diagram taken along a line I—I of FIG. 2.
Figure 4:
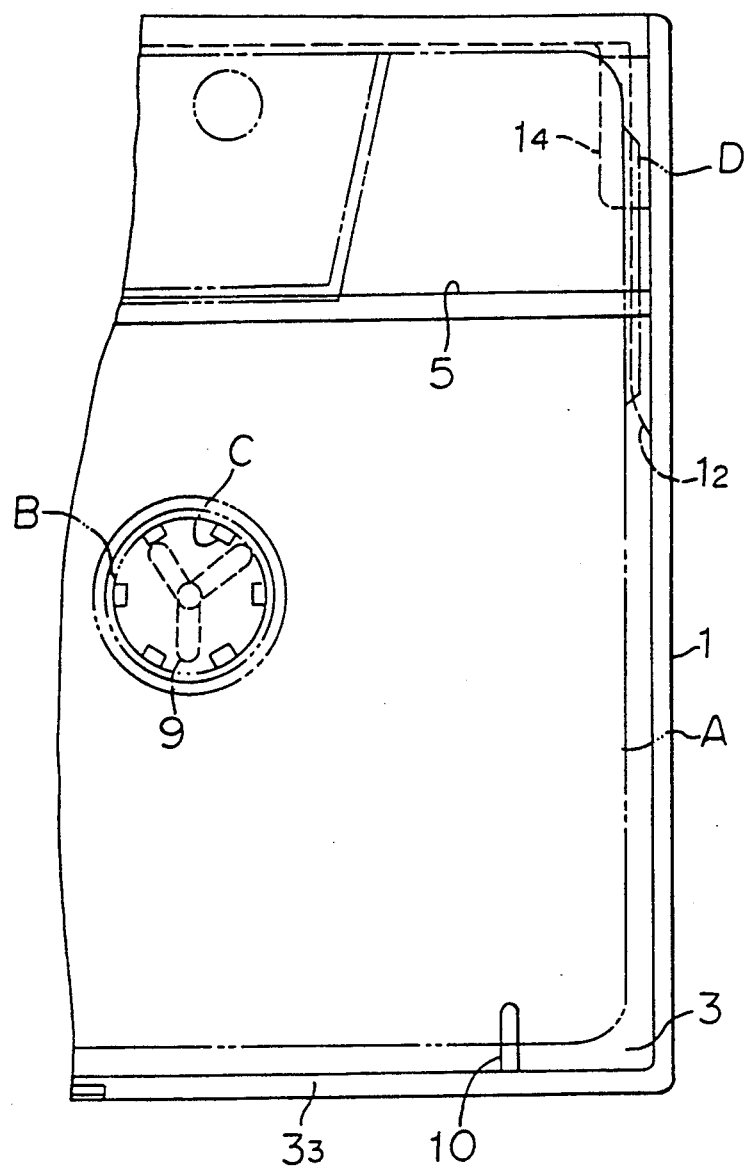
FIG. 4 is a magnified plain view of a part of the embodiment in a state wherein a tape cassette is accommodated.
Figure 5:
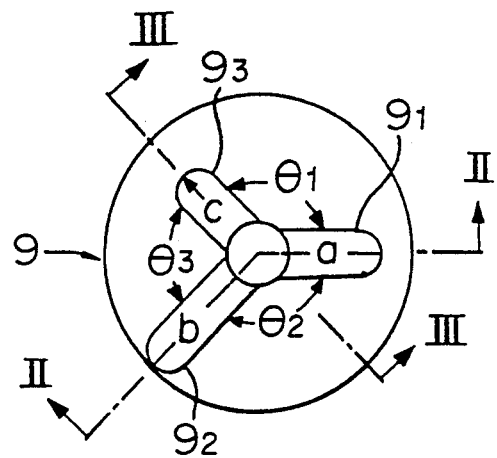
FIG. 5 is a magnified plane view of hub-rotation-preventive protrusions of the embodiment.
Figure 6A:
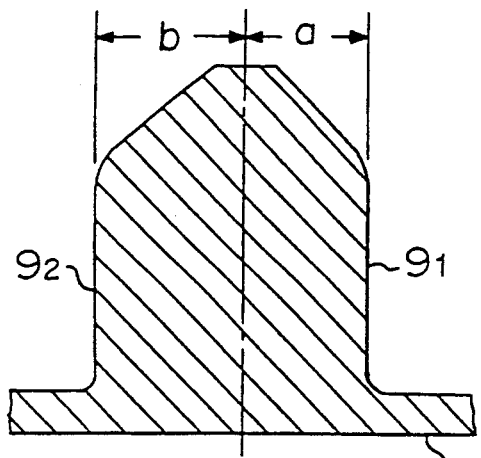
Figure 6B:
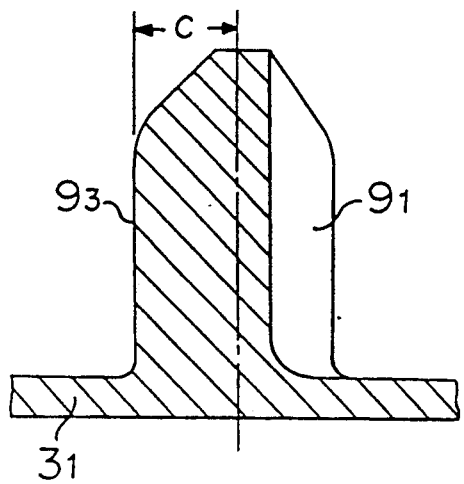
Figure 7A:
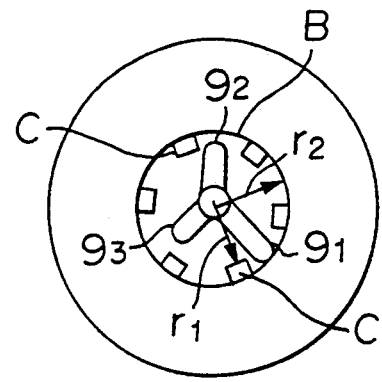
FIGS. 7A through 7F are explanatory plane views showing a motional relationship between a hub and hub-rotation-preventive protrusions.
Figure 7B:
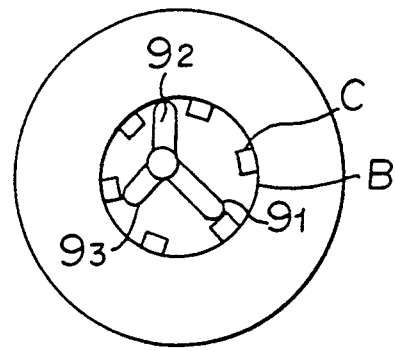
Figure 7C:
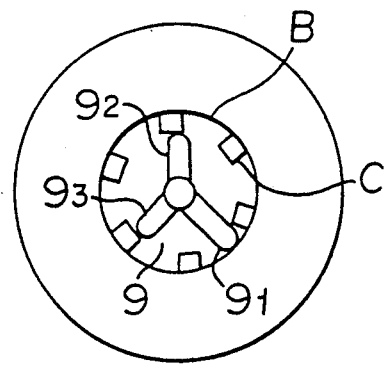
Figure 7D:
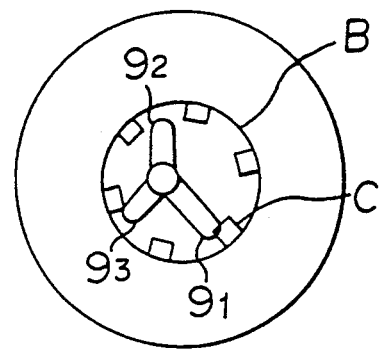
Figure 7E:
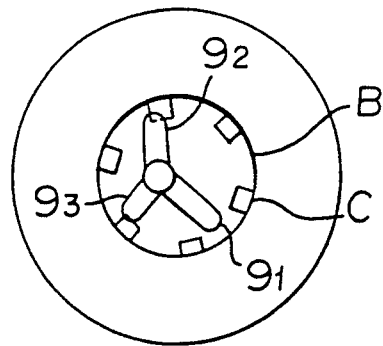
Figure 7F:
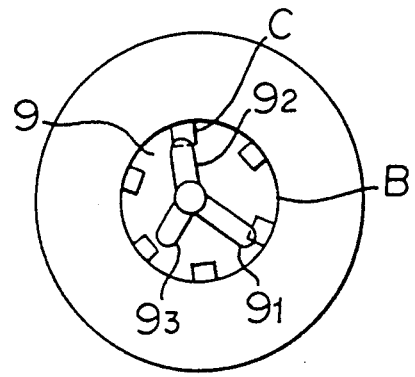

Explanation will be given to an Example of the present invention with reference to FIGS. 1 through 7F. This tape cassette accommodating case is composed of a case main body 1 provided with an accommodating portion for a tape cassette A, which engages with a lid 3 capable of opening and closing by engaging portions 2, wherein a pair of hub-rotation-preventive protrusions 9 are provided standingly on the lid 3. The hub-rotation-preventive protrusions 9 each is composed of at least three stopper pieces of two stopper pieces $9_1$ and $9_2$ having lengths "a" and "b" which can be inserted between hub claws C protruded into a hub hole B of the tape cassette A, and a stopper piece $9_3$ having a length "c" which can reach a front end of the hub claw. Angles $\theta_1$, $\theta_2$ and $\theta_3$ made by respective contiguous stopper pieces with respect to the center of the hub hole B are determined as $120° < \theta_2 < 180°$ and $\theta_1 + \theta_2 + \theta_3 = 360°$. The stopper pieces are radially provided.

The tape cassette accommodating case has the hub-rotation-preventive protrusions each of which is radially provided with at least three stopper pieces which are to be inserted into the hub hole B. The relationship between the radius $r_2$ of the hub hole B and the radius $r_1$ from the center of the hub hole to the front end of the hub claw, and the lengths of the respective stopper pieces a, b and c is, $c<a\leq b$, $r_1\leq a\leq r_2$, $r_1<b\leq r_2$ and $c<r_1$. The angles $\theta_2$, $\theta_3$ and $\theta_1$ made by the respective stopper pieces a and b, b and c, and c and a, are not multiples of 60°, wherein $120°<\theta_2<180°$ and $\theta_1+\theta_2+\theta_3=360°$.

For instance, in the case main body 1, an accommodating portion for accommodating a front end portion of the tape cassette A, is formed by a bottom wall $1_1$, a pair of side walls $1_2$, a back wall $1_3$ and a pair of supporting protruded pieces $1_4$ protruded from the both side walls $1_2$ in a face opposing the bottom wall 11 Cut-off portions 4 for engaging with finger touching portions D protruded from side faces of the tape cassette to be accommodated in the case, are provided in the side walls $1_2$. An engaging protrusion 6 and an engaging recess 7 are correspondingly provided respectively at the side wall $1_2$ of the case main body 1 and a side wall $3_2$ of the lid 3 which is to be laminated on the side wall $1_2$.

Furthermore, the supporting protruded pieces $1_4$ are opposingly arranged at the upper interior portions of the side walls $1_2$ of the case main body at positions not touching a head house of the tape cassette which is a trapezoidal elevated portion, having an approximately U-shaped form wherein the cut-off portion 4 agrees with the outer configuration of the finger touching portion D, and which are provided at the side wall $1_2$ of the case main body in parallel with the bottom wall of the case main body. Furthermore, on the inner faces of the bottom wall $1_1$ of the case main body 1 and an upper wall $3_1$ of the lid 3, recessed portions 5 and $5_1$ are provided for accommodating the head house of the tape cassette A, such that the tape cassette A can be maintained without play in accommodating it into the case.

Furthermore, the pair of hub-rotation-preventive protrusions each is composed of respective stopper pieces $9_1$, $9_2$ and $9_3$, an upper edge of each of which is of a slanted and converging shape and the upper edge and a side end edge are rounded. The two stopper pieces $9_1$ and $9_2$ are provided with lengths "a" and "b" which are approximately equal to the radius $r_2$ of the hub hole B, whereas the other stopper piece $9_3$ is provided with a length "c" which is approximately equal to the radius $r_1$ from the center for the hub hole B to the hub claw C.

The case main body 1 and the lid 3 are in a relative positional relationship. Therefore, a relationship therebetween opposite to the former embodiment, is applicable to the tape cassette accommodating case wherein the case main body is replaced by the lid and the lid is replaced by the case main body.

A cut-off portion 8 for finger touching is provided on the outer face of a front side wall $3_3$ of the lid 3, which facilitates the opening operation of the lid 3. Ribs 10 are protrudingly provided on the inner face of the lid 3 which regulates the position of the tape cassette in the thickness direction. Stopper protrusions 11 are provided at the corner portions of the case main body 1 which stop an index card (not shown) when it is incorporated in the case main body 1. It is not necessary that all of the case main body 1 and the lid 3 are transparent. It is possible to form an accommodating case which is excellent in design thereof, selecting an arrangement of transparent portions and intransparent portions.

As shown in FIGS. 7A through 7F in the positional relationship between the hub-rotation-preventive protrusion 9, the hub hole B and the hub claws C when the number of the stopper pieces are three, at least one of the stopper pieces $9_1$ and $9_2$ is put between the hub claws C (FIGS. 7B and 7C), the other stopper pieces $9_3$ touches the front end of the hub claw C. Even when the other stopper piece $9_3$ is a little away from the front end of the hub claw C, one of the stopper piece $9_1$ and $9_2$ touches an inner periphery of the hub hole B, thereby firmly stopping the rotation of the hub. On the other hand, when anyone of the stopper pieces $9_1$, $9_2$ and $9_3$ are in a position engaging with the hub claw C (FIGS. 7D through 7F), at least one of the stopper pieces operates in the direction of shifting the cassette. Therefore, the hub does not dig into the stopper pieces, which makes the opening operation of the lid easy. Nor, does the stopper piece mount on the hub claw C, which makes the closing operation of the lid 3 easy. In this way, the tape cassette accommodating case is employed safely without trouble.

The number of the stopper pieces of the hub-rotation-preventive protrusion 9 is not limited to three and may be more, for instance, four. In this case, the length of the fourth stopper piece is equal to or less than the length of the stopper piece c. Angles $\theta_1$, $\theta_2$, $\theta_3$ and $\theta_4$ made by the respective stopper pieces a, b, c and d are not multiples of 60°. Consideration is given to the arrangement of the stopper pieces such that the stopper pieces are located between the hub claws C and at angular positions wherein the stopper piece does not mount on the hub claw C. In this case, $120°<\theta_2<180°$, $\theta_1$, $\theta_3$, $\theta_4$ are not multiples of 60°, and $\theta_1+\theta_2+\theta_3+\theta_4=360°$.

In this invention, the hub-rotation-preventive protrusion is composed at least of three stopper pieces which are inserted into the hub hole B. The relationship between the radius $r_2$ of the hub hole B and radius $r_1$ from the center of the hub hole to the front end Of hub claw, and the lengths a, b and c of the respective stopper pieces, is $c<a\leq b$, $r_1\leq a\leq r_2$, $r_1<b\leq r_2$ and $c<r_1$. The angles $\theta_2$, $\theta_3$ and $\theta_1$ made by the respective stopper pieces a and b, b and c, and c and a are not multiples of 60°, $120°<\theta_2<180°$, and $\theta_1+\theta_2+\theta_3=360°$. Therefore, a tape cassette accommodating case can be provided with a simple construction and can be manufactured at an inexpensive cost, which is excellent in the appearance and grade, and wherein the hub-rotation-preventive function is promoted, the tape cassette can safely be accommodated and maintained without causing the shift in winding of the tape in the case, the handling of the tape cassette is simplified, and the generation of the upward shifting can be prevented.

We claim:

1. A tape cassette accommodating case for accommodating a cassette including two hub holes, each having at least one hub claw, the case comprising:
   a case main body forming an accommodating portion of a tape cassette;
   a lid provided at said case main body capable of opening and closing; and
   a pair of hub-rotation-preventive protrusions extending substantially perpendicularly from said lid;
   said pair of hub-rotation-preventative protrusions each being composed of at least three stopper pieces radially provided to be inserted into one of the hub holes, said at least three stopper pieces including first stopper piece a, second stopper piece b and third stopper piece c;
   wherein a relationship between a radius $r_2$ of each said hub hole and a radius $r_1$ from the center of the hub hole to a front end of a hub claw engaged therewith, and respective lengths of said first through third stopper pieces a, b, c have the relation: $c<a\leq b$, $r_1\leq a<r_2$, $r_1<b<r_2$, and $c<r_1$;

wherein angles of $\theta_2$, $\theta_3$ and $\theta_1$ respectively defined between said pieces a and b, b and c, and c and a are not multiples of 60°; and wherein $120°<\theta_2<180°$ and $\theta_1+\theta_2+\theta_3=360°$.

2. The cassette tape accommodating case according to claim 1, wherein the pair of hub-rotation-preventive protrusions each is composed of stopper pieces connected at the center of the hub-rotation-preventative protrusion, an upper edge of which is of a slanted and converging shape and the upper edge and a side end edge are rounded.

* * * * *